United States Patent
Rickers et al.

(10) Patent No.: US 6,385,518 B1
(45) Date of Patent: May 7, 2002

(54) INDUSTRIAL TRUCK WITH A TILT PREVENTION MECHANISM

(75) Inventors: Paul Rickers, Norderstedt; Ralf Baginski, Neetze; Frank Mänken, Norderstedt; Nis-Georg Nissen, Henstedt-Ulzburg, all of (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/553,035

(22) Filed: Apr. 20, 2000

(30) Foreign Application Priority Data

Apr. 29, 1999 (DE) .......................... 199 19 655

(51) Int. Cl.⁷ ............................... B66F 17/00
(52) U.S. Cl. ........................ 701/50; 340/440
(58) Field of Search .................. 701/50, 45, 124; 340/440

(56) References Cited

U.S. PATENT DOCUMENTS

| | | | | |
|---|---|---|---|---|
| 4,287,966 A | * | 9/1981 | Frees | 187/231 |
| 5,325,935 A | * | 7/1994 | Hirooka et al. | 180/211 |
| 5,684,254 A | * | 11/1997 | Nakazaki et al. | 73/774 |
| 5,894,094 A | * | 4/1999 | Kuchler et al. | 73/862.044 |
| 6,050,770 A | * | 4/2000 | Avitan | 414/636 |
| 6,082,742 A | * | 7/2000 | Ishikawa | 280/5.508 |

FOREIGN PATENT DOCUMENTS

| | | | |
|---|---|---|---|
| DE | 31 22 720 | | 1/1983 |
| DE | 3711239 A1 | * | 10/1987 |
| DE | 32 03 553 | | 9/1998 |
| EP | 0 465 838 | | 6/1991 |
| EP | 0 483 493 | | 9/1991 |
| EP | 466046 A1 | * | 1/1992 |
| EP | 0 873 893 | | 4/1998 |
| GB | 2290149 A | * | 12/1995 |

* cited by examiner

*Primary Examiner*—Michael J. Zanelli
(74) *Attorney, Agent, or Firm*—Vidas, Arrett & Steinkraus, P.A.

(57) ABSTRACT

An industrial truck, particularly a fork-lift truck, wherein the front and rear wheels are supported on a vehicle frame and one of which is adapted to be driven, a load-receiving means which is adjustable at least in height by means of a power-exerting apparatus, and a safety device which detects a tilt of the industrial truck and is in an operative communication at least with an alarm signal emitter, whereby a load sensor is associated with at least one wheel and the safety device has a comparison device which provides a signal to the alarm signal emitter when one or more of the wheel loads measured fall below a preset value.

10 Claims, 1 Drawing Sheet

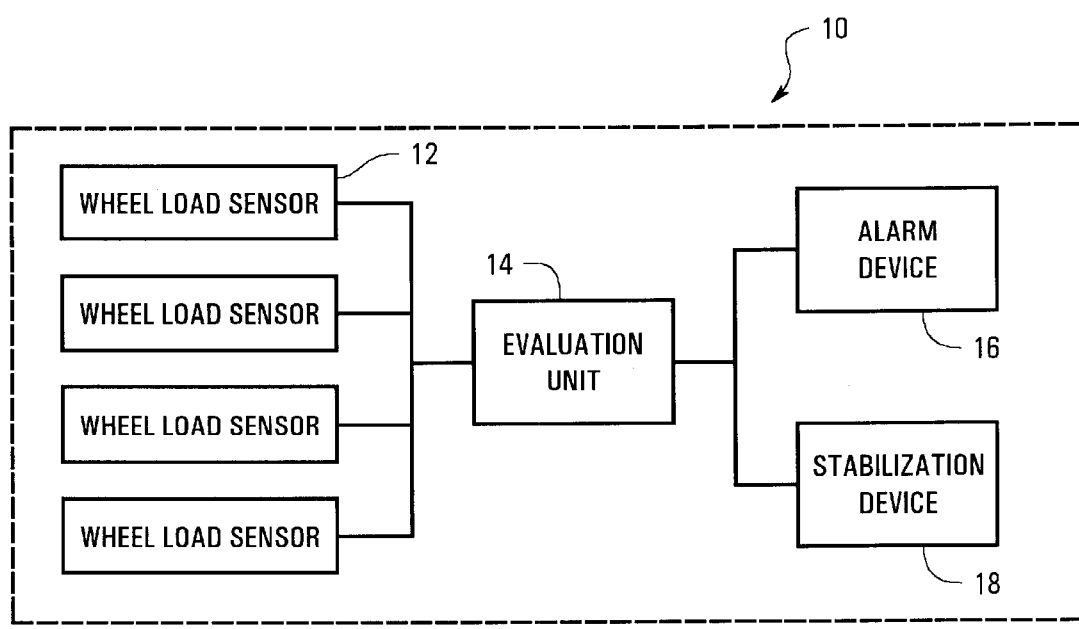

INDUSTRIAL TRUCK WITH A TILT PREVENTION MECHANISM

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to an industrial truck, particularly a fork-lift truck.

When industrial trucks are operated, stability problems might occur depending on their load and design types, which are provoked by static and dynamic causes.

In fork-lift trucks, the centre of gravity is naturally outside the wheel contact surface. The position of the centre of gravity varies depending on the magnitude of load. In an extreme case, it will shift beyond the load-side tilting edge, which causes the vehicle to turn over. If the centre of gravity of the load being received is offset sidewards relative to the longitudinal axis of the vehicle the centre of gravity of the whole system will be displaced towards the lateral edge of the wheel contact surface and will pass beyond it in an extreme case. This will then result in the vehicle tilting sidewards.

Many industrial trucks are fitted with load manipulation means by which the position of the load may be varied after a load is received. Thus, telescopable, inclinable, displaceable, and pivotable lifting devices are known for industrial trucks. When such load positioning devices are actuated to position the load the position of the load centre and, hence, the position of the overall centre of gravity of the industrial truck may be shifted in any spatial direction. In an extreme case, this may cause the projection of the overall centre of gravity onto the wheel contact plane to pass beyond the limiting lines of the wheel contact surface of the vehicle at any places, which again will result in an instability of the vehicle.

In addition to an unintentional displacement of the centre of load, which implies the consequences described, a shift of the centre of gravity may also be caused by extreme deformations of vehicle components or the load manipulation means. Finally, a reason why static stability problems exist can be that the vehicle is on an inclined plane. Even here, the projection of the overall centre of gravity on the wheel contact plane will possibly leave the wheel contact surface at any limiting line in the direction of weight forces.

As a dynamic cause of stability problems in industrial trucks which requires to be mentioned first is that the industrial truck is strongly slowed down oder sped up. It is not the position of the centre of gravity relative to the wheel contact surface of the vehicle which is varied here, but the inertia forces acting on the mass centre of gravity of the system cause a tilting moment that counteracts the contact restoring moment by their lever arm of force towards the wheel contact surface of the vehicle. When the tilting moment exceeds the magnitude of the contact restoring moment this will result in instability again and cause the vehicle to tilt. According to the same mechanism, when the vehicle takes corners or bends an instability of the vehicle will occur due to the centrifugal force acting onto the system centre of gravity. Moreover, an instability of the industrial truck may also be caused by vertical acceleration bumps at the load masses.

Of course, efforts are being made to detect the instable conditions of the industrial truck which are described and to draw the operator's attention to the critical situation by means of an alarm. From the Disclosed Patent Specification DE 3203553, it is known to associate the hydraulic circuit of the lift cylinder in industrial trucks with a sensor which determines the pressure and the magnitude of load, via this pressure. Naturally, the centre of gravity depends upon the height of load. From Patent Specification DE 4021984, it has further become known, apart from including pressure sensors in the hydraulic circuit, to incorporate sensors for detecting the inclination of the lift frame and for detecting the height of the load-receiving means in a tilt prevention system.

It is further known from EP 0 465 838, which claims priority from DE 4021984 to sense the relative motion between a rear axle assembly and the vehicle frame of the industrial truck so as to detect, in this way, that the vehicle is beginning to tilt about its front axle. Although this involves that the chassis structure becomes expensive it is natural that only an instability with respect to one tilting edge may be detected.

An industrial truck having a supervision means for its load condition has become known from EP 0 483 493. A measuring device operating, for example, by means of strain gauges receives vertical bearing forces and horizontal bearing forces occurring parallel to the vehicle's longitudinal axis. The measuring device is in communication with a measured-data computing unit which is connected to a load condition indicator. The system which is known helps determine loads acting onto the industrial truck from outside, e.g. the mass of the load being lifted, the moment of the load being lifted etc. and the actual constellation of the vehicle, e.g. its lifting height, pole inclination etc., and helps establish the critical conditions by means of such data. Since, however, there are many causes which may be accountable as causes of vehicle instability the way of overload detection requires that a multiplicity of status data of the industrial truck should be sensed and supervised.

From EP 0 873 893, it is known to additionally detect dynamic conditions such as the running speed and the steering angle of the vehicle in order to identify dynamic instability situations as well. Even this requires that a multiplicity of date be acquired and processed with a view to obtaining the safety effect desired.

It is the object of the invention to provide an industrial truck having a tilt prevention device which is particularly simple in design and will reliably detect the various instable conditions of the vehicle.

BRIEF SUMMARY OF THE INVENTION

The invention relies on the finding that any kind of instability is characterized in that the vertical response forces of one or more wheels of the industrial truck become zero. Therefore, the invention associates at least one wheel with a wheel load sensor the signals of which are provided to a comparing device and which emits an alarm signal when the wheel loads measured fall below a preset lower limit.

It is completely insignificant for the invention which causes are decisive for a real or beginning instability. What is finally decisive for the invention is that such instability be identified and it be established in time that the vehicle is nearing an instable condition. The invention not only identifies static instabilities, but also dynamic ones and even those which are provoked by an inclination of the wheel contact surface.

The operator of the industrial truck may be warned in time because an alarm signal is emitted. However, it is also imaginable to act on one or more functions of the industrial truck, namely, the height of the load, the steering turn, the speed of the vehicle, the inclination of the pole, the displacement of the load-receiving means in the direction of the longitudinal axis and/or even transversely thereto, the height adjusted for one or more shock absorbers and the like. In some cases, the industrial trucks may also be provided with a stabilization device with the aid of which the instable condition is counteracted. This device may also be activated in an appropriate way to prevent the vehicle from tilting.

It may be insufficient sometimes to detect by a certain single value that the wheel load is getting close to zero because a shift of the centre of gravity is often very quick so that counteractions cannot be initiated any more or have no effect any more. Therefore, in an aspect of the invention, it is advantageous that the gradient of the wheel load values measured are compared to a stored setpoint to detect that there is an undesirable approach to the limit or the limit is exceeded or there is a drop below it. During a transient detection and evaluation of the vertical wheel loads, it will be possible to predict the extended timed course of the wheel contact forces by means of an appropriate prognostic method. This enables a flexible situation-related determination of the values admissible for the lower limits of wheel loads.

Preferably, both the absolute wheel load value and the gradient of wheel load values are taken into account when the critical situation of tilt is approaching. When the wheel contact force is sufficient a large gradient value is uncritical. It will become critical when the wheel contact force nears a lower limit.

An additional benefit of the inventive device can be taken from a comparison of the wheel load sums in the loaded and non-loaded conditions of the vehicle and the magnitude of the load received may be calculated. In addition, the position of the centre of gravity of the system in space may be determined when the height of the load is sensed by means of a height measuring device for the load-receiving means. The center of gravity is determined using signals from the individual load sensors to measure the position of the projection of the centre of gravity on the floor. The center of gravity may also be determined from a signal from the height measuring device as well as signals from the load sensors.

An additional benefit of the inventive device can be taken from a comparison of the wheel load sums in the loaded and non-loaded conditions of the vehicle and the magnitude of the load received may be calculated. In addition, the position of the centre of gravity of the system in space may be determined when the height of the load is sensed by means of a height measuring device for the load-receiving means.

Wheel loads may be measured in an appropriate way by force transducers which are mounted. As such, strain gauges, piezometers, thin-film sensors or the like are adequate. According to the invention, another option is that the spacing between the wheel hub and the ground contact area is measured in the region of the wheels. The wheel load may also be calculated from the spacing and the resiliency of the rim. For the dimension, suitable non-contacting displacement transducers are known which, for example, operate by a laser.

BRIEF DESCRIPTION OF THE SEVERAL VIEWS OF THE DRAWINGS

A system drawing of the invention will now be briefly explained.

The only FIGURE shows a block diagram of the tilt prevention mechanism according to the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Referring to the figure, an industrial truck 2 is outlined in the box 10 which has two front wheels 4 and two rear wheels 6 and a load-receiving means 8 adjustable in height. Those components are generally known to one of ordinary skill in the art. Associated with each wheel is a wheel load sensor 12 which may be designed in a known manner such as a strain gauge, a piezoelectric transducer or the like. Wheel load sensors 12 provide a signal to an evaluation unit (safety device) 14 in which a registration has been made as to which values the signals of wheel load sensors are not allowed to assume individually or in combination in order to avoid instability. However, if such a condition occurs the evaluation unit provides a signal to an alarm device 16 and, simultaneously, to a stabilization device 18. For example, the stabilization device may consist in that the condition of telescopably extractable shock absorbers is varied. It may also consist in that the steering system of the vehicle is acted on, for example, when the instable condition occurs by too large a turning angle at a given speed. Also, the stabilization device may provide for the load-receiving means to be lowered when this enables an improvement to the position of the system centre of gravity. It should also be understood that either the front wheels, rear wheels or both may be used to drive the truck.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A fork-lift truck, comprising a vehicle frame supported by front and rear wheels, at least one of which is adapted to be driven, further comprising a load-receiving means which is adjustable along a mast at least in height by means of a power-exerting means, a safety device which detects a tilt of the truck and is in operative communication at least with an alarm signal emitter, at least one load sensor (12) being associated with at least one wheel, and the safety device (14) including a comparison device which provides a signal to the alarm signal emitter (16) when one or more of the wheel loads measured fall below a preset value, characterized in that the gradient of the wheel load is evaluated by the comparison device, and a signal is provided to the alarm signal emitter if the wheel load and the wheel load gradient reach preset combinations.

2. The fork-lift truck according to claim 1, characterized in that a load measuring device is provided for measuring the magnitude of the load received from the sum of signals of the load sensors.

3. The fork-lift truck according to claim 1, characterized in that a measuring device for the centre of gravity is provided which, using the signals from the individual load sensors, measures the position of the projection of the centre of gravity on the floor.

4. The fork-lift truck according to claim 3, characterized in that a height measuring device is associated with the load-receiving means and that the measuring device for the centre of gravity, using the signals from the load sensors and the signal from the height measuring device, determines the position of the system centre of gravity.

5. The fork-lift truck according to claim 1, characterized in that the load sensors have a force transducer.

6. The fork-lift truck according to claim 1, characterized in that the load sensors have a spacing measuring device which measures the spacing between the wheel hub and the wheel floor contact area, and that the safety device determines the wheel load from the spacing measured and at least one of the resiliency of the wheel rim and a resilient wheel suspension.

7. An fork-lift truck comprising:

a vehicle frame including front and rear wheels;

a load-receiving means which is adjustable in height by means of a power-exerting apparatus;

an evaluation unit which detects a tilt of the truck and is in operative communication with an alarm signal emitter;

a load sensor being associated with at least one wheel and wherein the evaluation unit has a comparison device which evaluates the gradient of the load on the at least one wheel and provides a signal to the alarm signal emitter when the at least one wheel measured load falls below a predetermined value, and the gradient of the load on the at least one wheel reach a predetermined value.

8. The fork-lift truck of claim 7 wherein the front wheels are adapted to be driven.

9. The fork-lift truck of claim 7 wherein the rear wheels are adapted to be driven.

10. A fork-lift truck, comprising a vehicle frame supported by front and rear wheels, at least one of which is adapted to be driven, further comprising a load-receiving means which is adjustable along a mast at least in height by means of a power-exerting means, a safety device which detects a tilt of the truck and generates a signal which effects at least one truck function selected from the group consisting of the height of the load; the turning of a steering wheel; the steering of at least one wheel; the speed of the truck; the tilt of the mast; the displacement of the load-receiving means relative to the mast along the longitudinal axis of the truck; the displacement of the load-receiving means relative to the mast along the transverse axis of the truck; the adjustment of one or more shock absorbers; and stabilizing means for the truck if the measured wheel load fairs below a predetermined value, characterized in that the gradient of the wheel load is evaluated by a comparison device, and a signal is provided to an alarm signal emitter if the wheel load and the wheel load gradient reach predetermined combinations.

* * * * *